US012578464B2

(12) United States Patent (10) Patent No.: US 12,578,464 B2
Klovning et al. (45) Date of Patent: Mar. 17, 2026

(54) COVER DETECTION

(71) Applicant: Elliptic Laboratories ASA, Oslo (NO)

(72) Inventors: Espen Klovning, Strømmen (NO); Tom Øystein Kavli, Oslo (NO)

(73) Assignee: Elliptic Laboratories ASA, Oslo (NO)

( * ) Notice: Subject to any disclaimer, the term of this patent is extended or adjusted under 35 U.S.C. 154(b) by 12 days.

(21) Appl. No.: 18/727,847

(22) PCT Filed: Feb. 23, 2023

(86) PCT No.: PCT/EP2023/054488
§ 371 (c)(1),
(2) Date: Jul. 10, 2024

(87) PCT Pub. No.: WO2023/165880
PCT Pub. Date: Sep. 7, 2023

(65) Prior Publication Data
US 2025/0076495 A1 Mar. 6, 2025

(30) Foreign Application Priority Data
Mar. 4, 2022 (NO) .................................... 20220273

(51) Int. Cl.
*G01S 15/04* (2006.01)
(52) U.S. Cl.
CPC .................................... *G01S 15/04* (2013.01)
(58) Field of Classification Search
None
See application file for complete search history.

(56) References Cited

U.S. PATENT DOCUMENTS 5,953,287 A * 9/1999 Willacy .................. G01S 15/88
73/290 V
6,987,707 B2 * 1/2006 Feintuch ................. G01S 15/04
367/87
(Continued)

FOREIGN PATENT DOCUMENTS

EP 2983063 A2 2/2016
NO 20191252 A1 3/2021
(Continued)

OTHER PUBLICATIONS

Patent Cooperation Treaty, International Application No. PCT/EP2023/054488, "International Search Report," May 23, 2023, 3 pages.

*Primary Examiner* — Fekadeselassie Girma
(74) *Attorney, Agent, or Firm* — Bradley Arant Boult Cummings LLP

(57) ABSTRACT
The present invention relates to a device and method for detecting a cover over at least part of an electronic device. The device comprising at least one audio transducer adapted to transmit and receive an acoustic signal. The method includes the steps of: •—defining at least one characteristic of an interrogation signal; •—transmitting, using at least one of said transducers, the interrogation signal within a predetermined frequency range, having the at least one characteristic; •—receiving, in at least one audio transducer, a signal, •—analyzing the characteristics of the received signal and the characteristics of the transmitted signal and detecting a selected number of differences between them, •—comparing the differences between the transmitted signal and the received signal with a predetermined set of differences related to an object covering at least one of the transducers in the device.

19 Claims, 3 Drawing Sheets

(56)  References Cited

U.S. PATENT DOCUMENTS

| | | | | |
|---|---|---|---|---|
| 8,879,150 | B1 * | 11/2014 | Wang .................... | G02B 5/3041 |
| | | | | 359/590 |
| 2012/0263019 | A1 * | 10/2012 | Armstong-Muntner ..................... | |
| | | | | G01S 15/003 |
| | | | | 367/118 |
| 2016/0178735 | A1 * | 6/2016 | Shirasaka ............. | G01S 7/4811 |
| | | | | 356/614 |
| 2017/0329431 | A1 * | 11/2017 | Lin ......................... | G01S 7/539 |
| 2019/0220112 | A1 * | 7/2019 | Thomas ................ | G01S 15/003 |
| 2021/0361233 | A1 * | 11/2021 | Wilson .................. | G06F 1/1637 |

FOREIGN PATENT DOCUMENTS

| | | | | | |
|---|---|---|---|---|---|
| NO | | 20211143 | A1 | 2/2023 | |
| NO | | 20211333 | A1 | 5/2023 | |
| WO | WO-2011048433 | A1 * | 4/2011 | .......... | G01S 15/876 |
| WO | WO-2021045628 | A1 | 3/2021 | | |

* cited by examiner

COVER DETECTION

TECHNICAL FIELD

The present teachings relate to a method for cover detection for an electronic device.

BACKGROUND ART

Electronic devices such as mobile phones, smart watches, etc usually comprise a proximity sensor that is used to detect proximity of an object, such as a user's body part, for example as discussed in US2017/329431 using ultrasound reflected from an object to detect the proximity. In mobile phones, the main function of such a proximity sensor is to detect when the user has positioned the device close to their ear during an ongoing phone call, in which case the touch-screen of the mobile device is disabled or switched off to prevent false touch events due to unintentional contact of the ear or another body part of the user with at least one of the screens of the mobile device. Since a touch screen is not normally used while the user is in a call and has positioned the device close to their head or next to their ear, the touch screen controller can either be switched off or may enter a low-power mode to save power. Additionally, the screen lighting of the device is also normally switched off to save power. Usually an infrared ("IR") proximity sensor is used, but ultrasonic proximity sensors can also be used.

In many mobile devices there is an additional requirement for cover detection or pocket mode as described in Norwegian patent application NO20211143. Cover detection is a close-range proximity detection with a purpose to determine whether the screen of the mobile device should be enabled or disabled. Close-range detection means detection if an object is closer than a few cm from the device screen, or more accurately closer than a few cm from the cover detection sensor of the device, usually within millimeters or even touching the device. Accordingly, one of the important purposes of the cover detection system is to prevent the screen from being enabled when it should stay turned off. By doing so, unintentional touch events and operations as a result of an unintentional enabling of the screen of the electronic device can be prevented. Similarly, the cover detection should also be reliable in allowing the user quick access to the screen whenever the user intends to operate the device. It will be understood that the user experience can be affected if the screen does not enable as soon as possible when the user wants access to the device. It is hence desired for the cover detection system to be able to reliably distinguish between events for which the screen should be enabled and the events in which the screen should remain disabled or in a sleep state. Moreover, the cover detection should respond quickly for a better user experience.

Some traditional proximity detection methods may be slower and have more performance issues than desirable to be usable in cover detection for achieving a smooth user experience. Additionally, achieving a responsive and reliable cover detection especially for relatively stationary objects can be a challenge for some sensor technologies.

Although ultrasound signals are used in proximity sensors in electronic devices (e.g smartphones), ultrasound is not an ideal technology for situations where the sensor components are covered by a completely static object close to the transducers. This will be the case if the smartphone is put on a table with the screen facing up and a piece of paper is put to rest on top of the phone covering the screen and therefore the proximity sensor.

In the protection cases that are available in the market, the detection of a flip-cover covering the screen, may be done, for example, using the touch-screen sensor of the mobile device, or the portion of the flip-cover that is used to cover the screen may be provided with a dedicated sensor such as a near-field communication ("NFC") sensor or a magnetic sensor that triggers a flip-case detection mode when the screen portion of the protection case comes within a predetermined distance of the screen of the mobile device. A protection case that requires a dedicated sensor for cover detection may be more expensive and less attractive to the customer.

SUMMARY

As discussed above it is an object of the present invention to provide a solution utilizing transducers already existing in an electronic device. This is obtained as specified in the accompanying claims.

The present invention is therefore suitable for using the same acoustic transducers in a device being used for both speaking and listening and for conventional proximity detection where an object is to be detected within a certain range form the device. The invention is based on the fact that an acoustic signal emitted behind a cover will result in a different signal at the receiver depending on whether it has propagated freely through the environment or if it has been confined between a device and a cover, object or similar and will primarily be operated when the wavelength of the acoustic signal is longer than the distance from the transducers to the cover. The detection may be seen as a pressure wave propagating from the transmitter to the receiver, or an increased pressure build-up around the transducers. If the same transducer is used for transmitting and receiving signals the cover may be detected as a change in sensed acoustic impedance close to the transducer.

Specifically, experiments have shown that the amplitude of the received signal will increase at the presence of a cover, but as will be discussed below, the analysis may be configured to adapt to the specific case, e.g. to differentiate between different covers, e.g. having structures causing absorption or reflections and interference, or use. The analysis should be defined so as to differentiate between the direct propagation from transmitter to receiver without cover and the propagation confined between the cover and device. This may be achieved through a learning procedure performed by the user and a user interface defining different situations based on exemplified use, e.g. registering when the device is covered, when a mobile phone is held close to the ear, etc.

In practice the present invention may thus operate by transmitting an acoustic signal and detecting a resulting change at the receiver at the same moment or a short time after the transmission, before a reflection is to be expected. The received signal may be compared to signals previously registered signals characterizing a signal propagating along an uncovered device surface, or such signals may have been filtered out. The analysis may also compare the received signals with previous instances where the device surface is covered so as to recognize predetermined signal characteristics.

According to an aspect, the interrogation signal may be in the audible range with frequencies or frequency chirps from below 5 kHz depending on the situation. Combining the audible signals with ultrasound is also possible, e.g. increasing resolution if the device also is adapted to measure non-static, moving objects, for example detected using an IMU (inertia measuring unit) in the device, when the object is at a larger distance from the device. In addition, if no ambient sound is detected the device may use ultrasound only.

If an audio use-case is running concurrently on the electronic device, the interrogation signal may be selected from the output of the audio use-case to avoid generating a specific interrogation signal for the cover detection method. This requires that the audio use-case signal is made available to the cover detection method and can be analyzed to find suitable interrogation signals within the existing audio output. This audio loopback is described in more detail in Norwegian patent application 20211333. If the ambient noise is above a certain threshold, the audio output may be amended with an additional interrogation signal or the amplitude of the parts of the audio output signal which are ideally suited as interrogation signals may be amplified to create an identifiable interrogation signal given the ambient noise in the first acoustic signal. It may also be possible to analyze the ambient noise, e.g. using neural networks or machine learning, to predict the noise pattern and transmit the interrogation signal in periods with sufficient ambient noise.

If the device is a personal device (e.g. smartphone, Smart Watch) where the user receives notifications sounds or alarms or other sounds, even vibrations, played out on the speaker, the cover detection method could be enabled and piggyback on the sound being played and use the sound as the interrogation signal to find out if the receiver detects if the received signal corresponds with previously detected signals or store characteristics characterizing that a cover is in place.

In scenarios where the cover detection method is triggered only when other device sensors indicate that the cover detection state must be either updated as described in Norwegian application NO20211143 or detected due to user actions (e.g. pushing the power button, touching the screen, raising the phone, etc), the cover detection method could play out a short, configurable notification sound that is acceptable and even selectable to users if the phone is not already configured to play specific sounds in these situation. The available notification sounds in the electronic device should include a set of interrogation signals suitable for cover detection give the current ambient noise level and the acoustic characteristics of the cover detection module.

The interrogation signals for a specific device may be selected through a calibration process where the user is told to perform a set of actions while the cover detection method is enabled. The actions would be to cover the device with at least one type but potentially different types of readily available types of objects or remove the object covering the device when instructed to do so. The device may also be put in a pocket or in a bag. Since the user will provide the ground truth of relevant recordings on this particular device, the machine learning models could be improved by using an incremental ML training process of at least one neural network used in the cover detection method making sure the performance of the method is optimized for the device in question.

Some user action that mandates use of cover detection will inherently move the mobile device significantly. One example is the raise-to-wake feature on modern smartphones where the cover detection state will decide if a biometric authentication mechanism usually involving at least one camera should be activated. In situations like this one, the acoustic cover detection mechanism could use an additional interrogation signal in the ultrasound frequency range and do the echo analysis of the received ultrasound too.

According to one embodiment, the device may be set to listen to background noise or sounds from the surroundings and may then be configured to adapt the interrogation signal to frequency bands with low noise level, possibly also in the ultrasound range if the environment is silent and the user does not want audible sounds from the device.

The interrogation signal may thus be scaled up and down based on a prediction of both the current level and possible future changes in the ambient noise level being picked up while the interrogation signal is played out by the cover detection method. The prediction can be based on statistical methods, standard ML-based training in different environments or up-to-date incremental training on the device in question in the current location.

According to an aspect, the first audio transducer and the second audio transducer are the same transducer which is capable to transmitting the interrogation signal and receiving the first acoustic signal and the echo, or the first transducer may be a microphone and the second audio transducer may be a speaker of in electronic device.

According to an aspect, the characteristic of the interrogation signal is the amplitude of the interrogation signal. Alternatively, or in addition, the characteristic of the interrogation signal is the transmission length or the time-period for which the interrogation signal is transmitted. Accordingly, either one or both of: the amplitude, and the time-period of the interrogation signal to be transmitted is determined from the analysis of the first signal. By doing so the interrogation signal can be adapted, or one or more suitable characteristics of the interrogation signal can be computed according to the prevailing conditions in which the electronic device is located in. Thus, the cover detection method can allow finding a suitable interrogation signal such that the hearability of the interrogation signal is at least minimized or even eliminated for a typical human user. Furthermore, power consumption may be optimized according to the prevailing conditions. The characteristic of the interrogation signal can be chosen depending on the specific use and may include phase, frequency, and/or amplitude of the interrogation signal as well as frequency chirps or other coding.

According to an aspect, the characteristics of the interrogation signal may be selected by the processing unit based upon the analysis detected noise from the environment, e.g. by monitoring the background noise. The frequency of the interrogation signal may then be selected such that the hearability at the selected frequency estimated to be less as compared to hearability of the interrogation signal at another frequency. The processing unit may thus analyze the frequency spectrum of the first signal and determine the frequency of the interrogation signal. The processing unit may even analyze the power of specific frequencies or a specific group of frequencies in the first signal for finding a suitable frequency, or rather any of the at least one characteristic of the interrogation signal.

By selecting to use a low amplitude of the interrogation signal, the processing unit may use a longer interrogation signal even for improving the cover detection. The opposite can also be done, i.e., the processing unit may reduce the transmission length and increase the amplitude of the interrogation signal. The processing unit may select the characteristics between successive transmission cycles of the interrogation signal, or the processing unit may adapt the characteristics dynamically during an ongoing transmission of the interrogation signal.

Accordingly, pursuant to the proposed teachings, a reliable cover detection can be achieved whilst minimizing the hearability of the interrogation signal for a typical user.

Additionally, the interrogation signal can be selected according to the prevalent noise conditions. This synergistic effect can thus be advantageous for adapting the interrogation signal essentially simultaneously not only according to the hearability, but also according to acoustic noise around the device.

Viewed from yet another perspective, the present teachings can also provide a computer software product for implementing any method steps disclosed herein. Accordingly, the present teachings also relate to a computer readable program code having specific capabilities for executing any method steps herein disclosed. In other words, the present teachings relate also to a non-transitory computer readable medium storing a program causing an electronic device to execute any method steps herein disclosed.

Example embodiments are described hereinafter with reference to the accompanying drawings. Drawings may not necessarily be drawn to scale, without that affecting the scope of generality of the present teachings.

DETAILED DESCRIPTION

Figure 1:
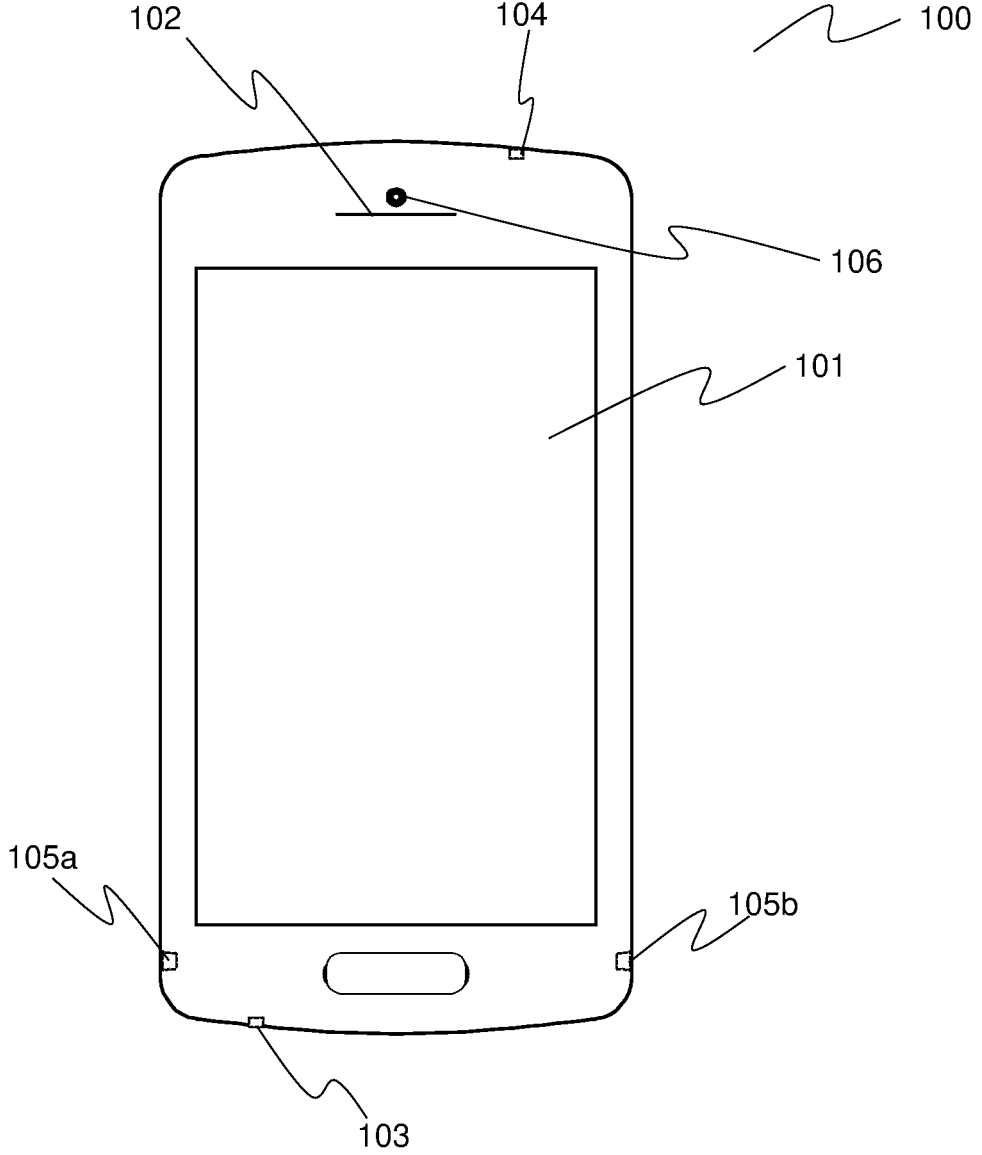
FIG. 1 shows a perspective front view of an electronic device with a proximity detection system

FIG. 1 shows an example perspective front view of an electronic device 100 which is shown here as a mobile phone or smartphone. The mobile phone 100 has a screen 101 for displaying content and for interacting with the device 100.

Above the top-edge 110 of the screen 101, an earpiece 102 and a proximity sensor 106 are located. The proximity sensor 106 will preferably be constituted by a transmitter and receiver.

The terms top, bottom, left, right are used in the disclosure in a non-limiting relative sense for the ease of understanding. Moreover, the location of the respective components such as the proximity sensor 106 is shown just as an example. Those skilled in the art will appreciate that such a sensor, or even the earpiece 102 can be located at a different position as compared to those in this example, without affecting the scope or generality of this disclosure.

As will be understood, the earpiece 102 comprises a speaker that is used for outputting acoustic signals such as audio of a call. In certain phones, the same speaker in the earpiece 102 may also be used for outputting ultrasonic signals, for example for ultrasound-based user interaction. Some devices may even have dedicated ultrasonic transducers for touchless interactions. The screen 101 can comprise not only a display for displaying content such as pictures and videos, but also a touchscreen sensor for touch-based user interaction. The proximity sensor 106 is according to the present invention an acoustic-detection based sensor, or another type of sensor suitable for proximity detection. The proximity sensor 106 has field of view ("FoV"), which is a three-dimensional envelope or space around the sensor 106 within which the sensor 106 can reliably detect a proximity event, such as a near event defined when the object or cover is too close to use acoustic reflections for detection. Detection of a near event is used, for example, to be able to switch off the touchscreen and display (or screen 101) of the device 100 such that undesired touchscreen operation may be prevented. Such an undesired touchscreen operation could otherwise occur when the user has placed the earpiece 102 in contact or close proximity to their ear and if the touchscreen were not disabled. Detection of a near event by using the proximity sensor 105 is used to disable the touchscreen such that undesired touchscreen operations can be prevented.

FIG. 1 also shows a pair of loudspeakers 105 and a microphone 103. Some phones may comprise one or more other speakers, such as 105, which are used for handsfree operation and/or for audio playback. Such other speakers 105 can be different from the earpiece 102, and such speakers 105 can be larger than the speaker in the earpiece. In the example shown, left speaker 105a and the right speaker 105b may be used for playing stereophonic audio. The microphone 103 on the bottom side of the phone 100 is commonly used for calls, especially when the user is holding the earpiece 102 close to their ear. The microphone 103 may also be used for handsfree operation or for other audio capture or recording.

Some phones may even comprise one or more additional microphones, for example a microphone 104 located on the top side of the phone. The additional microphone can for example be used for stereophonic audio capture, or for other purposes. There may even be multiple microphones on the top-side and/or on the bottom-side, or even on any of the sides of the device 100. In some devices, multiple microphones and/or multiple speakers may even be used for ultrasonic interaction with the device 100. Multiple receiver transmitter combinations may be used to extract spatial information of the surroundings. In some cases, such ultrasonic sensing arrangement realized by speakers and microphones may remove the requirement of a dedicated proximity sensor 106. Accordingly, in such cases, the device 100 may not have a separate proximity sensor 106.

It can be appreciated from FIG. 1 that the proximity sensor 106 requires precious space on the screen side of the device. Accordingly, in most cases a bezel 102 may be required to accommodate such components as the dedicated proximity sensor 106. In absence of such components, the screen 101 could be extended towards the edges of the device, thereby utilizing most, if not all, of the screen side of the device 100 as display area rather than wasting the space on dead area of the bezel 102.

Figure 2:
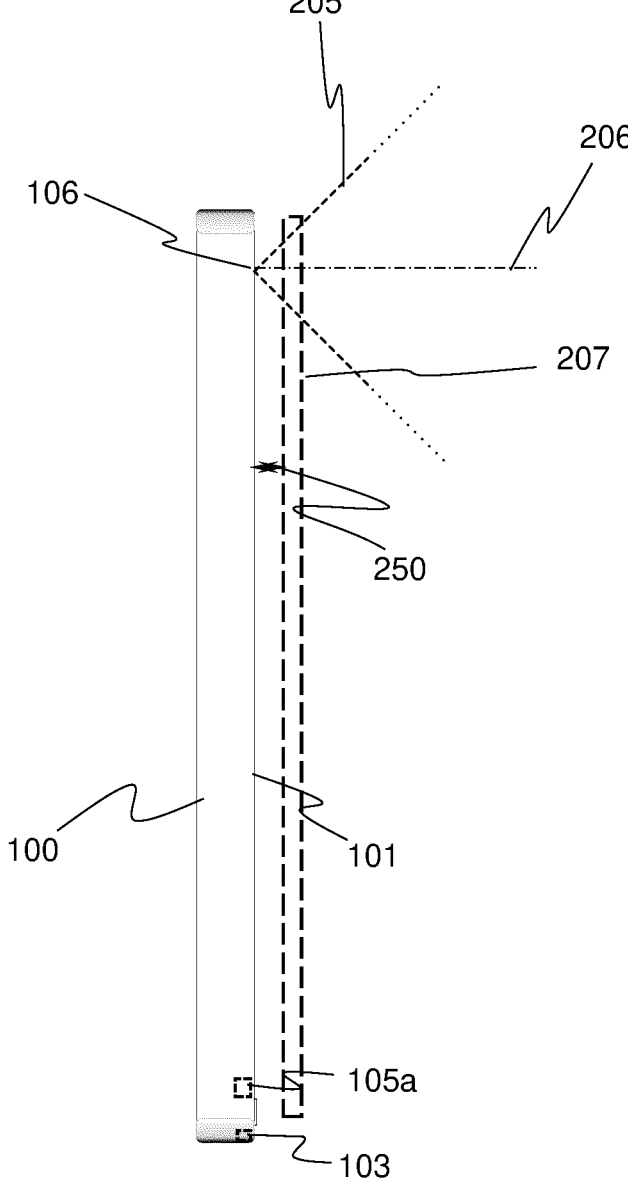
FIG. 2 shows a perspective side view of an electronic device with a proximity detection system FIG. 3 illustrating the circuitry of the device according to the invention.

FIG. 2 shows a perspective side-view of the device 100. The FoV 205 of the proximity sensing system is illustrates as extending in a divergent manner from the proximity sensor 106 along an axis 206 such that the cross-sectional area of the FoV 205 in a plane normal to the axis 206 increases with distance from the proximity sensor 106 along the axis 206. If the device is not covered the acoustic signal propagates through the space over the transmitter 106 and the receivers 105 may detect reflections detecting the proximity of a person or object as discussed in NO20211333.

As illustrated in FIG. 2, a cover 207 is indicated covering the device as well as a screen at a distance 250 from the surface 101. In some cases, this distance will be zero, for example if the device is placed with the transducers 105, 106 facing down on a table, using a protecting cover or simply being placed in a pocket. In situations where the device is a phone held up to the ear, the ear and head thus constituting the cover, there may be a distance 250 between the transmitter and the cover. Usually, this distance will be well below the wavelength of the acoustic signal and thus the acoustic signal is partially constrained between the cover and the device, having a different effect on the signals received at the receivers than a signal reflected from a more distant object. The signal may be described as a waveguide for acoustic or pressure waves propagating in the plane between the cover and device, possibly being affected by structures providing interference and reflections within the waveguide.

Figure 3:
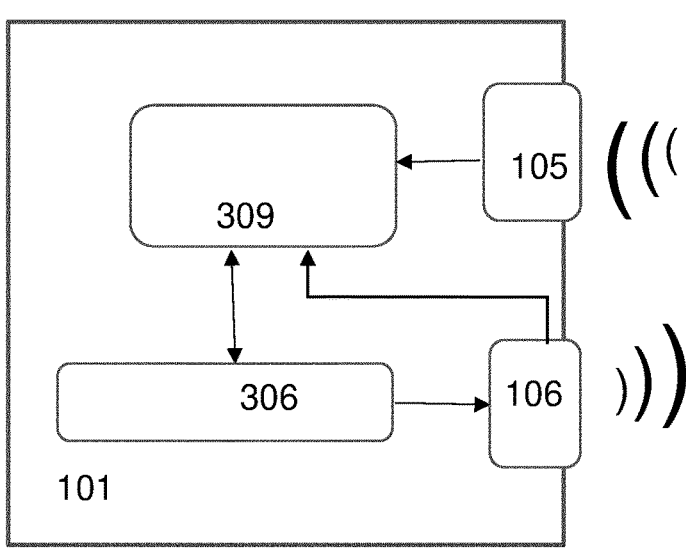

As illustrated in FIG. 3 the device 101 according to the invention includes a processing unit 309 for processing the received signals at the microphone 105. In order to provide the analysis of the received signal the signals transmitted by the speaker 106 must be known. This may be accomplished in the speaker driver circuitry 306 by sending a signal with known characteristics to the speaker 106. However, as the speaker may be a multipurpose transducer there may be limitations to affecting the transmitted signal and thus a reference signal may be communicated directly from the speaker 106 to the processor 309 to provide a direct comparison between the transmitted signal and the received signal, as discussed in abovementioned NO20211333. As the comparison may be direct different types of audio signals may be used as interrogation signals, including alarms, music etc.

As mentioned above, according to another embodiment of the invention the receiver or microphone 105 may listen independently of the transmission thus providing a monitoring of the background noise or sounds, e.g. as part of a voice activation system. The processor may then analyze the background signal and instruct the speaker driver circuitry to select signal transmission in a frequency range or at an amplitude.

The processing unit is a computer or data processor such as a microprocessor or microcontroller. The processing unit may be a combination of different hardware components or modules. In some cases, the processing unit may essentially be a virtual machine running on a processor. In some cases, the processing unit may also include at least one machine learning module for improving the accuracy of measurements over use cases of the electronic device. The processing unit may further include an artificial intelligence ("AI") module.

Figure 4:
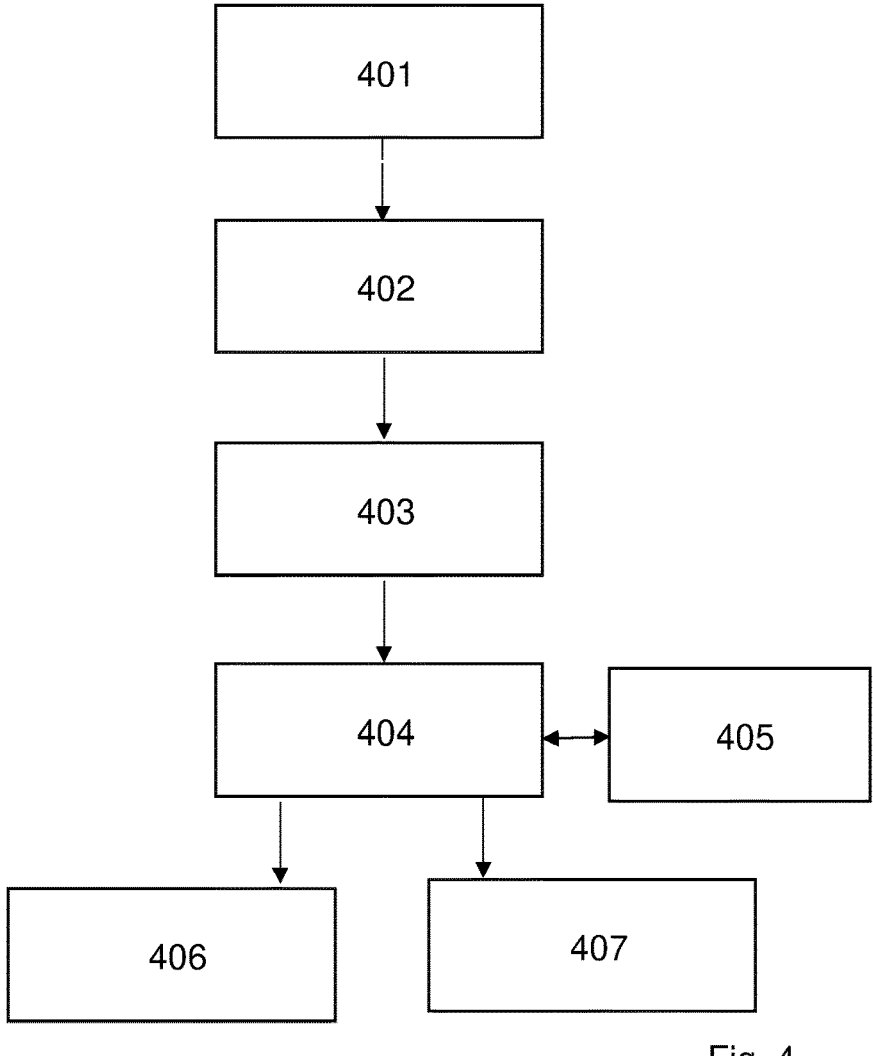
FIG. 4 illustrates the typical process according to the invention.

The method according to the invention is illustrated in FIG. 4 starting a step 401 where an interrogation signal is defined and transmitted through a speaker or similar 106. The interrogation signal has a known characteristic which is predetermined or transmitted directly from the speaker 106 or acoustic driver circuit 306. The characteristic may be parts of the signal, such as defined frequencies or chirps, or a known piece of music or sound.

A signal is received 402 during the same time period, possibly also a time period immediately after the transmission at least one received such as an audio transducer.

The difference between the transmitted and received signal may then be analyzed 403. The time delay between the transmission and reception of the signal characteristics may as such be an indication whether the device with transducers is covered, as well as amplitude alone and/or frequency dependent. The received signal may thus be analyzed to find a selected number of differences, the number depending on the situation.

The detected differences and then compared 404 with a predetermined set of differences 405 stored in a computer memory in the processor 309. As is indicated the comparison and the result of this comparison may be added to the storage 405 and through machine learning or other analyzing means update the predetermined set of differences.

If the comparison indicates that the received data indicate that the device is covered, the processor will provide a set of instructions suitable for this situation, such as deactivating the display or touch surface 406, or if the comparison leads to the instruction set activating the display and touch sensitive surface 407. These instructions may be configured by the user.

To summarize the present invention relates to a device or method for detecting a cover over at least part of an electronic device comprising at least one audio transducer adapted to transmit and receive an acoustic signal. The method may comprise:

defining at least one characteristic of an interrogation signal;

transmitting, using at least one of said transducers, the interrogation signal within a predetermined frequency range, having the at least one characteristic;

receiving, in at least one audio transducer, a signal, analyzing the characteristics of the received signal and the characteristics of the transmitted signal and detecting a selected number of differences between them, comparing the differences between the transmitted signal and the received signal with a predetermined set of differences related to an object covering at least one of the transducers in the device.

The electronic device may be a mobile phone or table or even a laptop, being able to detect if the acoustic transducers are covered.

As an initial step, the receiver may be used for detecting acoustic signals from the environment, and then adjusting the transmitted signal to avoid interference with the signals form the environment. The analysis of the acoustic signal from the environment may include providing the ambient noise level as a function of frequency in a chosen frequency range corresponding to the frequency range of the interrogating signal. The characteristic is chosen according to the ambient noise level, so that the transmitted level is less than the ambient noise level by a predetermined amount, or according to the ambient noise level as a function of frequency over the chosen frequency range.

The interrogation signal is preferably in the audible range with frequencies from below 1 kHz to 20 kHz, and possibly being constituted at least partially by an audio signal, such as a music track. Alternatively, the interrogation signal is in pulses, the interval depending on the ambient noise level or other measured activity such as device movements or is constituted by frequency chirps within the predetermined frequency range. The acoustic transmitter and receiver may be separate transducers of be constituted by one transducer being capable of operation in both modes.

According to one embodiment of the invention the comparison of the transmitted and received signal is based on previously store comparisons, the prestored comparisons being based on a neural network or machine training of previously measured, preprocessed or raw microphone data.

The present invention also relates to an electronic device having a touch sensitive surface and/or display surface, also including an acoustic transmitter and an acoustic receiver. The acoustic transmitter is connected to speaker driver circuitry, applying a known signal to the speaker transmitting an acoustic interrogation signal with selected characteristics. The acoustic receiver is connected to a processor for receiving and processing an acoustic signal where the processor is also connected to the driver circuitry or speaker at least for receiving selected information related to the characteristics of the transmitted interrogation signal. Based on analysis of the transmitted and received information, the processor being configured to detect a selected number of differences. The differences between the transmitted signal and the received signal may then be compared with a predetermined set of differences related to a specific object covering at least one of the transducers in the device. This way the object may also be classified and recognized.

The processor preferably includes computer storage including a number of changes in the selected differences related to the presence of an object covering the device, and the selected differences are preprocessed based on previous cover detections, e.g. using machine learning or neural network processing module.

The invention claimed is:

1. A method for detecting a cover over at least part of an electronic device comprising at least one audio transducer adapted to transmit and receive an acoustic signal, the method comprising:

defining at least one characteristic of an interrogation signal;

transmitting, using at least one of said transducers, the interrogation signal within a predetermined frequency range having a wavelength longer than the distance from the at least one transducer to the cover, and having the at least one characteristic;

receiving, in at least one audio transducer, a signal;

analyzing the characteristics of the received signal and the characteristics of the transmitted signal and detecting a selected number of differences between them;

comparing the differences between the transmitted signal and the received signal with a predetermined set of differences related to an object covering at least one of the transducers in the device; and wherein a space between at least one of the transducers and the object acts as a waveguide for acoustic waves propagating between at least one of the transducers and the object.

2. The method according to claim 1, including an initial step of detecting acoustic signals from the environment and adjusting the transmitted signal to avoid interference with the signals form the environment.

3. The method according to claim 2, wherein the analysis of the acoustic signal from the environment includes providing the ambient noise level as a function of frequency in a chosen frequency range corresponding to the frequency range of the interrogating signal.

4. A method for detecting a cover over at least part of an electronic device comprising at least one audio transducer adapted to transmit and receive an acoustic signal, the method comprising:

detecting acoustic signals from the environment and adjusting the transmitted signal to avoid interference with the signals form the environment defining at least one characteristic of an interrogation signal;

transmitting, using at least one of said transducers, the interrogation signal within a predetermined frequency range having a wavelength longer than the distance from the at least one transducer to the cover, and having the at least one characteristic;

receiving, in at least one audio transducer, a signal;

analyzing the characteristics of the received signal and the characteristics of the transmitted signal and detecting a selected number of differences between them;

comparing the differences between the transmitted signal and the received signal with a predetermined set of differences related to an object covering at least one of the transducers in the device; and wherein the characteristic is chosen according to the ambient noise level, so that the transmitted level is less than the ambient noise level by a predetermined amount.

5. A method for detecting a cover over at least part of an electronic device comprising at least one audio transducer adapted to transmit and receive an acoustic signal, the method comprising:

defining at least one characteristic of an interrogation signal;

transmitting, using at least one of said transducers, the interrogation signal within a predetermined frequency range having a wavelength longer than the distance from the at least one transducer to the cover, and having the at least one characteristic;

receiving, in at least one audio transducer, a signal;

analyzing the characteristics of the received signal and the characteristics of the transmitted signal and detecting a selected number of differences between them; and comparing the differences between the transmitted signal and the received signal with a predetermined set of differences related to an object covering at least one of the transducers in the device;

wherein the analysis of the acoustic signal from the environment includes providing the ambient noise level as a function of frequency in a chosen frequency range corresponding to the frequency range of the interrogating signal; and wherein the characteristic is chosen according to the ambient noise level as a function of frequency over the chosen frequency range.

6. The method according to claim 1, wherein the interrogation signal is in the audible range with frequencies from below 1 kHz to 20 kHz.

7. The method according to claim 6, wherein the interrogation signal is an audio signal.

8. The method according to claim 1, wherein the interrogation signal is in pulses, the interval depending on the ambient noise level or other measured activity such as device movements.

9. The method according to claim 1, wherein the interrogation signal is constituted by frequency chirps within the predetermined frequency range.

10. The method according to claim 1, wherein the transmitter and receiver is constituted by the same transducer.

11. A method for detecting a cover over at least part of an electronic device comprising at least one audio transducer adapted to transmit and receive an acoustic signal, the method comprising:

defining at least one characteristic of an interrogation signal;

transmitting, using at least one of said transducers, the interrogation signal within a predetermined frequency range having a wavelength longer than the distance from the at least one transducer to the cover, and having the at least one characteristic;

receiving, in at least one audio transducer, a signal;

analyzing the characteristics of the received signal and the characteristics of the transmitted signal and detecting a selected number of differences between them;

comparing the differences between the transmitted signal and the received signal with a predetermined set of differences related to an object covering at least one of the transducers in the device; and wherein the comparison of the transmitted and received signal is based on previously store comparisons, the prestored comparisons being based on a neural network or machine training from preprocessed or raw microphone data.

12. The method according to claim 8, wherein the other measured activity comprises device movements.

13. An electronic device having at least one of a touch sensitive surface and a display surface, also including an acoustic transmitted and an acoustic receiver, the acoustic transmitter being connected to speaker driver circuitry, transmitted a known signal to the speaker transmitting an acoustic interrogation signal, and the acoustic receiver being connected to a processor for receiving and processing an acoustic signal, the processor also being connected to the driver circuitry or speaker for receiving selected information related to the characteristics of the transmitted interrogation signal, the processor being configured to analyze the characteristics of the received signal and the characteristics of the transmitted signal and detecting a selected number of differences between them, comparing the differences between the transmitted signal and the received signal with a predetermined set of differences related to an object covering at least one of the transducers in the device, wherein a space between at least one of the transducers and the object acts as a waveguide for acoustic waves propagating between at least one of the transducers and the object.

14. The electronic device according to claim 13, wherein the processor includes computer storage including a number of changes in the selected differences related to the presence of an object covering the device.

15. An electronic device having a touch sensitive surface and/or display surface, also including an acoustic transmitted and an acoustic receiver, the acoustic transmitter being connected to speaker driver circuitry, transmitted a known signal to the speaker transmitting an acoustic interrogation signal, and the acoustic receiver being connected to a processor for receiving and processing an acoustic signal, the processor also being connected to the driver circuitry or speaker for receiving selected information related to the characteristics of the transmitted interrogation signal, the processor being configured to analyze the characteristics of the received signal and the characteristics of the transmitted signal and detecting a selected number of differences between them, comparing the differences between the transmitted signal and the received signal with a predetermined set of differences related to an object covering at least one of the transducers in the device;

wherein the processor includes computer storage including a number of changes in the selected differences related to the presence of an object covering the device; and wherein the selected differences are preprocessed based on previous cover detections.

16. The electronic device according to claim 13, wherein the interrogation signal is in the range of 1 kHz to 20 KHz.

17. The electronic device according to claim 13, wherein the interrogation signal is below 5 kHz.

18. The electronic device according to claim 13, wherein the transmitter and receiver are constituted by the same transducer.

19. An electronic device having a touch sensitive surface and/or display surface, also including an acoustic transmitted and an acoustic receiver, the acoustic transmitter being connected to speaker driver circuitry, transmitted a known signal to the speaker transmitting an acoustic interrogation signal, and the acoustic receiver being connected to a processor for receiving and processing an acoustic signal, the processor also being connected to the driver circuitry or speaker for receiving selected information related to the characteristics of the transmitted interrogation signal, the processor being configured to analyze the characteristics of the received signal and the characteristics of the transmitted signal and detecting a selected number of differences between them, comparing the differences between the transmitted signal and the received signal with a predetermined set of differences related to an object covering at least one of the transducers in the device;

wherein the processor includes computer storage including a number of changes in the selected differences related to the presence of an object covering the device;

wherein the selected differences are preprocessed based on previous cover detections and wherein the selected differences are preprocessed using a machine learning or neural network processing module.

* * * * *